(12) United States Patent
Morita et al.

(10) Patent No.: US 11,489,217 B2
(45) Date of Patent: Nov. 1, 2022

(54) BATTERY PACK

(71) Applicant: TDK Corporation, Tokyo (JP)

(72) Inventors: Hideyo Morita, Tokyo (JP); Takamitsu Tsuna, Tokyo (JP)

(73) Assignee: TDK CORPORATION, Tokyo (JP)

( * ) Notice: Subject to any disclaimer, the term of this patent is extended or adjusted under 35 U.S.C. 154(b) by 390 days.

(21) Appl. No.: 16/738,627

(22) Filed: Jan. 9, 2020

(65) Prior Publication Data
US 2020/0243935 A1    Jul. 30, 2020

(30) Foreign Application Priority Data

Jan. 24, 2019 (JP) .............................. JP2019-010108

(51) Int. Cl.
*H01M 10/6555* (2014.01)
*H01M 10/653* (2014.01)
*H01M 10/658* (2014.01)

(52) U.S. Cl.
CPC ..... *H01M 10/6555* (2015.04); *H01M 10/653* (2015.04); *H01M 10/658* (2015.04)

(58) Field of Classification Search
CPC ........... H01M 10/653; H01M 10/6555; H01M 10/658
See application file for complete search history.

(56) References Cited

U.S. PATENT DOCUMENTS

| 5,352,545 A | 10/1994 | Furukawa et al. |
| 5,558,956 A | 9/1996 | Gujer et al. |
| 2005/0100783 A1 | 5/2005 | Ro et al. |
| 2007/0224498 A1 | 9/2007 | Kim et al. |
| 2009/0311590 A1 | 12/2009 | Ro et al. |
| 2010/0028758 A1 | 2/2010 | Eaves et al. |
| 2010/0247990 A1 | 9/2010 | Ugaji et al. |
| 2011/0045334 A1 | 2/2011 | Meintschel et al. |
| 2011/0159340 A1* | 6/2011 | Hu ................... H01M 10/6555 429/120 |
| 2011/0223457 A1 | 9/2011 | Lee et al. |
| 2011/0300431 A1 | 12/2011 | Smith et al. |
| 2012/0107664 A1 | 5/2012 | Lee et al. |
| 2012/0114985 A1* | 5/2012 | Kim ................... H01M 50/502 429/159 |
| 2012/0177965 A1 | 7/2012 | Lee et al. |
| 2013/0224549 A1 | 8/2013 | Lee et al. |
| 2013/0266839 A1 | 10/2013 | Miura et al. |
| 2015/0056482 A1 | 2/2015 | Kyla-Kaila et al. |
| 2015/0325823 A1 | 11/2015 | Smith et al. |

(Continued)

FOREIGN PATENT DOCUMENTS

| CN | 102117945 A | 7/2011 |
| JP | 2001-143677 A | 5/2001 |

(Continued)

*Primary Examiner* — Brittany L Raymond
(74) *Attorney, Agent, or Firm* — McDermott Will & Emery LLP

(57) ABSTRACT

Disclosed herein is a battery pack that includes: a plurality of thin cells arranged in a matrix form in a first direction and a second direction perpendicular to the first direction, wherein a width of each thin cell in the first direction is smaller than widths of each thin cell in the second direction and a third direction perpendicular to the first and second directions, and wherein each of the thin cells has a surface substantially perpendicular to the first direction; a heat insulating member that insulates heat between the thin cells adjacent in the first direction; and a heat conducting member that contacts in common the surfaces of the thin cells arranged in the second direction.

7 Claims, 13 Drawing Sheets

(56) References Cited

U.S. PATENT DOCUMENTS

| | | |
|---|---|---|
| 2016/0093895 A1 | 3/2016 | Du et al. |
| 2016/0107009 A1 | 4/2016 | Cordani |
| 2016/0172727 A1 | 6/2016 | Chan et al. |
| 2017/0077487 A1 | 3/2017 | Coakley et al. |
| 2019/0148707 A1 | 5/2019 | Coakley et al. |
| 2019/0280260 A1 | 9/2019 | Shimizu |
| 2020/0358152 A1* | 11/2020 | Shimizu .............. H01M 10/647 |

FOREIGN PATENT DOCUMENTS

| | | |
|---|---|---|
| JP | 2005-116430 A | 4/2005 |
| JP | 2007-506242 A | 3/2007 |
| JP | 2008-198860 A | 8/2008 |
| JP | 2009-099445 A | 5/2009 |
| JP | 2010-062093 A | 3/2010 |
| JP | 2011-507199 A | 3/2011 |
| JP | 2012-511802 A | 5/2012 |
| JP | 2013-513202 A | 4/2013 |
| JP | 2013-218935 A | 10/2013 |
| JP | 2017-517841 A | 6/2017 |
| JP | 2019-083150 A | 5/2019 |
| WO | 2016/136674 A1 | 9/2016 |
| WO | 2018/037860 A1 | 3/2018 |
| WO | 2018/143464 A1 | 8/2018 |
| WO | 2019/031457 A1 | 2/2019 |
| WO | 2019/058937 A1 | 3/2019 |
| WO | 2019/059045 A1 | 3/2019 |
| WO | 2019/082509 A1 | 5/2019 |
| WO | 2019/088195 A1 | 5/2019 |
| WO | 2019/151036 A1 | 8/2019 |

* cited by examiner

BATTERY PACK

BACKGROUND OF THE INVENTION

Field of the Invention

The present invention relates to a battery pack and, more particularly, to a battery pack including a plurality of lithium-ion batteries arranged in a matrix form.

Description of Related Art

With a recent increase in environmental awareness, an ESS (Energy Storage System) capable of achieving peak-cut of power consumption and capable of being also as a backup in the event of a power cut has drawn attention. The ESS is constituted by a battery pack having a structure in which a plurality of cells (secondary batteries) are connected in series or in parallel. As a cell constituting a battery pack of such a type, a NiCad battery, a lead-acid battery and an alkaline battery have conventionally been used; on the other hand, a sodium-sulfur battery, a redox flow battery, a fuel battery, and a lithium-ion battery are recently increasingly used.

The cell constituting the battery pack generates heat during operation. When such heat is accumulated in a storage battery, an abnormal heat generation or a fire may occur, so that the battery pack generally has a mechanism for releasing heat. Examples of such a mechanism are shown in several patent documents.

JP 2001-143677 A discloses a battery pack configured such that the surfaces of adjacent cells are connected using a heat radiating plate and that the heat radiator plate is air-cooled. JP 2013-218935 A discloses an example in which a plate that surface-contacts each of a plurality of cells arranged in a planar direction for heat conduction in the planar direction. JP 2011-507199 discloses an example in which, in a battery pack having a plurality of cylindrical cells arranged in the axial and lateral directions, a heat conducting plate is disposed between cells adjacent in the axial direction. JP 2012-511802 discloses an example configured such that heat radiating members are each disposed between stacked plate-like cells and that a heat exchange member is provided so as to integrally connect the heat radiating members.

JP 2013-513202 discloses an example in which a metal sheet having high heat conductivity is provided between laminated plate-like cells. JP 2009-099445 A discloses an example in which, in a battery pack obtained by vertically arranging plate-like heat sinks to both surfaces of which a plurality of cells adhere, the cells adjacent in the vertical direction are disposed separated from each other. JP 2007-506242 discloses an example configured such that a physical space is provided between adjacent cells and that the cells are cooled by air flowing in the space. JP 2017-517841 discloses an example in which battery packs to both surfaces of which a plurality of cells adhere horizontally are vertically stacked.

The recent cases have shown that there is a possibility of abnormal heat generation in a lithium-ion battery. Thus, when the lithium-ion battery is used as a cell constituting the ESS, it is desired to provide a mechanism for preventing propagation of abnormal heat generation. That is, it is desired to prevent, if one cell undergoes abnormal heat generation, propagation of the abnormal heat generation to an adjacent cell. However, conventional battery packs do not have such a mechanism.

Assuming a battery pack in which a plurality of thin cells having a width in the y-direction smaller than the widths thereof in the x- and z-directions are arranged in a matrix form in the x- and y-directions, the following two methods can be considered to prevent the propagation of abnormal heat generation.

The first method is to suppress heat conduction between the thin cells adjacent in the y-direction. The opposing area is large between the thin cells adjacent in the y-direction, so that if there is no heat insulating structure therebetween, heat generated from one thin cell that has undergone abnormal heat generation is immediately conducted to the other thin cell, that is, propagation of the abnormal heat generation occurs. For example, in the example disclosed in JP 2009-099445, heat is immediately conducted between two cells opposed to each other through the heat sink, thus failing to prevent the propagation of abnormal heat generation. On the other hand, the opposing area is small between the thin cells adjacent in the x-direction, so that the propagation of abnormal heat generation is comparatively less likely to occur.

The second method is to immediately diffuse heat generated due to the abnormal heat generation. However, when heat is diffused between the thin cells adjacent in the y-direction, the propagation of abnormal heat generation is more likely to occur as described above, so that it is necessary to perform heat diffusion while preventing the heat diffusion between the thin cells adjacent in the y-direction.

SUMMARY

It is therefore an object of the present invention to immediately diffuse heat generated due to abnormal heat generation in a battery pack in which a plurality of thin cells having a width in the y-direction smaller than the widths thereof in the x- and z-directions are arranged in a matrix form in the x- and y-directions while suppressing heat conduction between the thin cells adjacent in the y-direction to thereby prevent propagation of the abnormal heat generation of a certain thin cell to an adjacent thin cell.

A battery pack according to a first aspect of the present invention is a battery pack in which a plurality of thin cells each having a width in a first direction smaller than the widths thereof in a second direction perpendicular to the first direction and a third direction perpendicular to the first and second directions are arranged in a matrix form in the first and second directions, and includes a heat insulating member that insulates heat between the thin cells adjacent in the first direction and a heat conducting member that contacts in common the surfaces of the plurality of thin cells arranged in the second direction whose each normal direction is the first direction.

According to the first aspect of the present invention, it is possible to immediately dissipate heat generated due to abnormal heat generation by means of the heat conducting member while suppressing heat conduction between the thin cells adjacent in the first direction by means of the heat insulating member. This makes it possible to prevent propagation of the abnormal heat generation occurring in any one of the thin cells.

The battery pack according to the first aspect of the present invention may have a structure in which each of the plurality of thin cells is sandwiched between the heat insulating member and the heat conducting member. Further, in the battery pack according to the first aspect of the present invention, the heat insulating member may include a heat insulating sheet, and the structure in which each of the plurality of thin cells is sandwiched between the heat insulating member and the heat conducting member may be a structure in which the heat insulating sheet and thin cells are sandwiched by a resin holder having a housing capable of housing the thin cell and the heat conducting member, wherein the resin holder and the heat conducting member may be fixed to each other.

In the above battery pack, the resin holder may have a porous space between the thin cells adjacent in the second direction. With this configuration, the occurrence of convection is suppressed as compared to when only one large cavity is formed, making it possible to suppress heat conduction between the thin cells adjacent in the second direction.

A battery pack according to a second aspect of the present invention is a battery pack in which a plurality of unit stacked bodies each including first to fourth thin cells stacked in the thickness direction are arranged in the planar direction perpendicular to the thickness direction. The unit stacked body includes first to fourth heat conducting members and first to third heat insulating members. The first thin cell is sandwiched between the first heat conducting member and the first heat insulating member, the second thin cell is sandwiched between the first heat insulating member and the second heat conducting member, the third thin cell is sandwiched between the third heat conducting member and the third heat insulating member, and the fourth thin cell is sandwiched between the third heat insulating member and the fourth heat conducting member. The second heat insulating member is sandwiched between the second and third heat conducting members. The first to fourth heat conducting members are each a common plate-like member for the plurality of unit stacked bodies.

According to the second aspect of the present invention as well, it is possible to immediately dissipate heat generated due to abnormal heat generation by means of the heat conducting member while suppressing heat conduction between the thin cells adjacent in the first direction which is the thickness direction by means of the heat insulating member. This makes it possible to prevent propagation of the abnormal heat generation occurring in any one of the thin cells.

The battery pack according to the second aspect may include: a first resin holder positioned between the first and second thin cells and having a first housing that houses the first thin cell and a second housing that houses the second thin cell; a second resin holder positioned between the third and fourth thin cells and having a third housing that houses the third thin cell and a fourth housing that houses the fourth thin cell; a first fixing member that fixes the first and second heat conducting members to the first resin holder to form a first structural body including the first heat conducting member, first thin cell, first heat insulating member, second thin cell and second heat conducting member; a second fixing member that fixes the third and fourth heat conducting members to the second resin holder to forma second structural body including the third heat conducting member, third thin cell, third heat insulating member, fourth thin cell and fourth heat conducting member; and a third fixing member that fixes the first and second structural bodies to the second heat insulating member. With this configuration, it is possible to easily constitute a battery pack including a large number of thin cells.

In the above battery pack, the first and second fixing members may be configured such that the end portions thereof do not protrude from the surfaces of the respective first to fourth heat conducting members. This can prevent the first and second fixing members from being an obstruction in forming the battery pack.

Further, in the above battery pack, each of the unit stacked bodies may further include fourth and fifth heat insulating members, the first housings may house therein the first insulating member, the second housings may house therein the fourth insulating member, the third housings may house therein the third insulating member, and the fourth housings may house therein the fifth insulating member. With this configuration, it is possible to suppress heat conduction between the thin cells adjacent in the thickness direction more effectively.

A battery pack according to a third aspect of the present invention is a battery pack in which a plurality of thin cells each having a width in a first direction smaller than the widths thereof in a second direction perpendicular to the first direction and a third direction perpendicular to the first and second directions are arranged in a matrix form in the first and second directions. The plurality of thin cells include first and second thin cells. A first heat conducting member, the first thin cell, a first insulating member, a second heat conducting member, the second thin cell and a second heat insulating member are stacked in order in the first direction. The first and second heat conducting members each contact in common the surfaces of the plurality of thin cells arranged in the second direction whose each normal direction is the first direction.

According to the third aspect of the present invention as well, it is possible to immediately dissipate heat generated due to abnormal heat generation by means of the heat conducting member while suppressing heat conduction between the thin cells adjacent in the first direction by means of the heat insulating member. This makes it possible to prevent propagation of the abnormal heat generation occurring in any one of the thin cells.

The battery pack according to the third aspect may include: a first fixing member that fixes the first heat conducting member to the first heat insulting member to form a first structural body including the first heat conducting member, first thin cell and first heat insulating member; a second fixing member that fixes the second heat conducting member to the second heat insulating member to form a second structural body including the second heat conducting member, second thin cell and second heat insulating member; and a third fixing member that fixes the first and second structural bodies to each other. With this configuration, it is possible to easily constitute a battery pack including a large number of thin cells.

A battery pack according to a fourth aspect of the present invention is a battery pack in which a plurality of unit stacked bodies each including first and second thin cells stacked in the thickness direction, a heat insulating member sandwiched between the first and second thin cells, a first heat conducting member sandwiched between the first thin cell and the heat insulating member, and a second heat conducting member sandwiched between the second thin cell and the heat insulating member are arranged in the planar direction perpendicular to the thickness direction. The first and second heat conducting members each being a common plate-like member for the plurality of unit stacked bodies.

According to the fourth aspect of the present invention as well, it is possible to immediately dissipate heat generated due to abnormal heat generation by means of the heat conducting member while suppressing heat conduction between the thin cells adjacent in the first direction which is the thickness direction by means of the heat insulating member.

The battery pack according to the fourth aspect may include a first resin holder that houses therein the first thin cell and a second resin holder that houses therein the second thin cell, and the first and second heat conducting members and the heat insulating member may be disposed between the first and second resin holders. With this configuration, it is possible to easily constitute a battery pack including a large number of thin cells using the resin holder.

A battery pack according to a fifth aspect of the present invention is a battery pack in which a plurality of first thin cells arranged in the planar direction perpendicular to the thickness direction, a plurality of second thin cells arranged in the planar direction perpendicular to the thickness direction, a first resin holder having a plurality of first housings that house therein the plurality of first thin cells, a second resin holder having a plurality of second housings that house therein the plurality of second thin cells, a plurality of first heat insulating members disposed between the bottoms of the plurality of first housings and the plurality of first thin cells, a plurality of second heat insulating members disposed between the bottoms of the plurality of second housings and the plurality of second thin cells, a first heat conducting member fixed to the first resin holder so as to close the plurality of first housings, and a second heat conducting member fixed to the second resin holder so as to close the plurality of second housings. The second heat conducting member is positioned between the first and second resin holders.

According to the fifth aspect of the present invention as well, it is possible to immediately dissipate heat generated due to abnormal heat generation by means of the heat conducting member while suppressing heat conduction between the thin cells adjacent in the first direction which is the thickness direction by means of the heat insulating member. In addition, the number of stacked layers of the thin cell can be made arbitrary (e.g., can be an odd number).

The battery pack according to the fifth aspect may further include a first fixing member that fixes the first heat conducting member to the first resin holder, a second fixing member that fixes the second heat conducting member to the second resin holder, and a third fixing member that fixes the first and second resin holders to each other. With this configuration, it is possible to easily constitute a battery pack including a large number of thin cells using the resin holder.

According to the present invention, it is possible to immediately dissipate heat generated due to abnormal heat generation by means of the heat conducting member while suppressing heat conduction between the thin cells adjacent in the first direction by means of the heat insulating member. This makes it possible to prevent propagation of the abnormal heat generation occurring in any one of the thin cells.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

Hereinafter, embodiments of the present invention will be described in detail with reference to the accompanying drawings. First, the background art of the present invention and problems thereof and, then the basic idea of the present invention for solving the problems will be described, followed by description of the embodiments of the present invention.

Figure 13A:
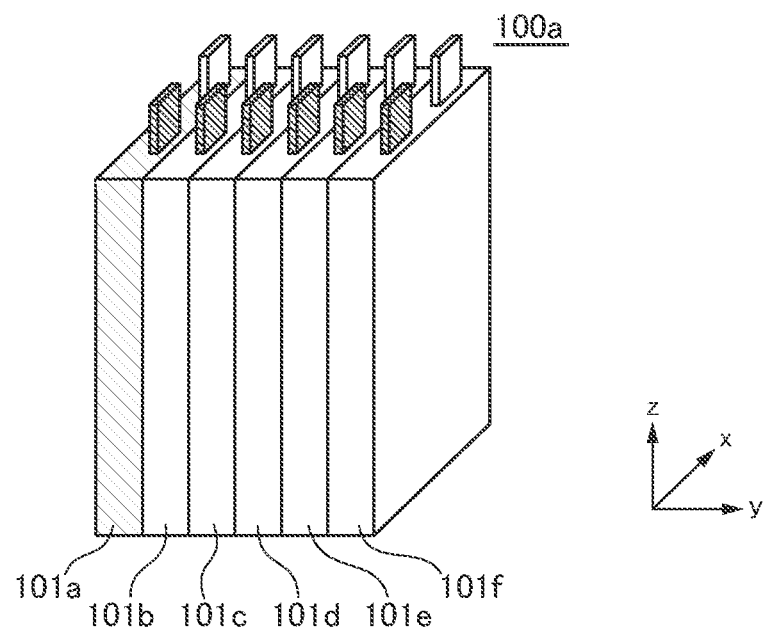
FIG. 13A is a view illustrating the background art of the present invention.

FIG. 13A is a view illustrating the background art of the present invention. The figure illustrates a battery pack 100a. The battery pack 100a has a structure in which six thin cells 101a to 101f each constituted by a rectangular parallelepiped lithium-ion battery having a width in the y-direction (first direction) is smaller than the widths thereof in the x-direction (second direction perpendicular to the first direction) and the z-direction (third direction perpendicular to both the first and second directions) are stacked in close contact with one another in the y-direction. Hereinafter, when there is no need to distinguish the thin cells 101a to 101f, they are sometimes referred to collectively as "thin cell 101". The surface of the thin cell 101 whose normal direction is the x-direction is referred to as an x-direction surface, the surface of the thin cell 101 whose normal direction is the y-direction is referred to as an y-direction surface, and the surface of the thin cell 101 whose normal direction is the z-direction is referred to as an z-direction surface. The same notations will be used for other configurations.

In general, the lithium ion battery may ignite when the main body temperature reaches 150° C. If the temperature of the thin cell 101a reaches 150° C. to catch fire, the temperature of the thin cell 101a is drastically increased by fire to about 600° C. Then, the adjacent thin cell 101b increases in temperature and catches fire when the temperature thereof reaches 150° C. In this battery pack 100a, the fire of the thin cell 101 may spread in this manner.

Figure 13B:
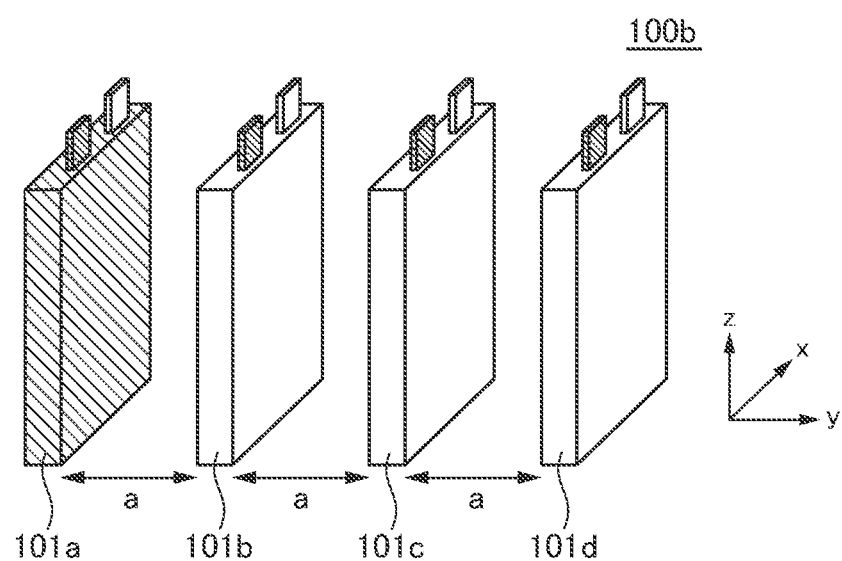
FIG. 13B is a view illustrating an example of a configuration for preventing propagation of abnormal heat generation.

FIG. 13B is a view illustrating an example of a configuration for preventing propagation of abnormal heat generation. The configuration illustrated was designed by the present inventor, and hence, has not yet been known to the public at the time of filing of the present application. In a battery pack 100b illustrated in FIG. 13B, four thin cells 101a to 101d are stacked at an interval a in the y-direction. According to this structure, if the thin cell 101a undergoes abnormal heat generation, an increase in the temperature of the adjacent thin cell 101b is suppressed when the interval a is sufficiently large, thereby preventing propagation of the abnormal heat generation. However, the interval a needs to be made considerably large in order to prevent the propagation of abnormal heat generation, so that this method is not realistic. Further, heat dissipation is less likely to occur between the adjacent thin cells 101, so that the temperature of the thin cell 101 that has undergone the abnormal heat generation becomes higher than that in the example of FIG. 13A and may increase to about 700° C., for example.

Figure 13C:
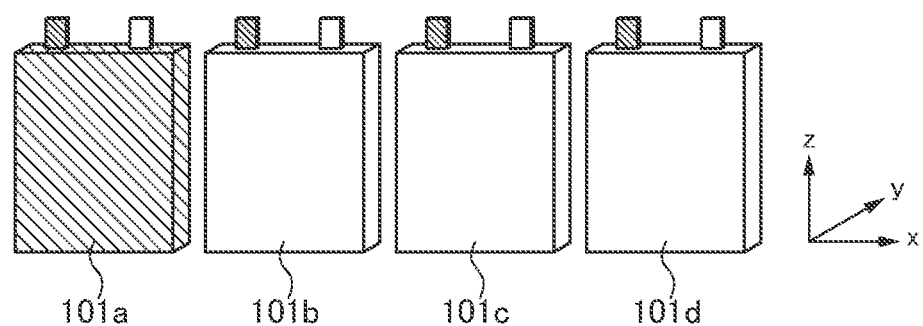
FIG. 13C is a view illustrating another example of a configuration for preventing the propagation of abnormal heat generation.

FIG. 13C is a view illustrating another example of a configuration for preventing the propagation of abnormal heat generation. The configuration illustrated was also designed by the present inventor, and hence, has not yet been known to the public at the time of filing of the present application. In a battery pack 100c illustrated in FIG. 13C, four thin cells 101a to 101d are arranged in the x-direction. According to this structure, the contact area between the adjacent thin cells 101 is smaller than that in the example of FIG. 13A, so that the propagation of abnormal heat generation can be made less likely to occur. However, as in the example of FIG. 13B, heat dissipation is less likely to occur between the adjacent thin cells 101, so that the temperature of the thin cell 101 that has undergone the abnormal heat generation becomes higher than that in the example of FIG. 13A and may increase to about 700° C., for example. Furthermore, normally, the batteries 100c including the thin cells 101a to 101d are arranged in the y-direction to constitute one battery pack as a larger unit, so that, after all, it is difficult to prevent the propagation of abnormal heat generation.

Figure 1A:
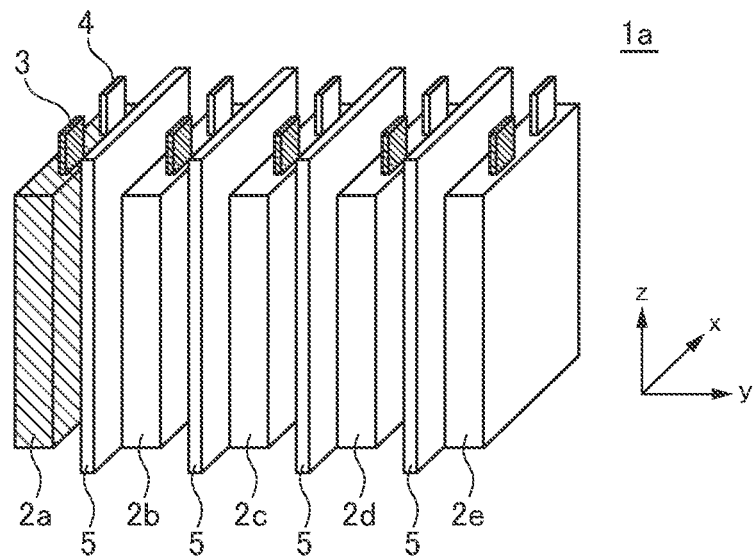
FIGS. 1A and 1B are views illustrating the basic idea of the present invention for solving the problems in the background art.
Figure 1B:
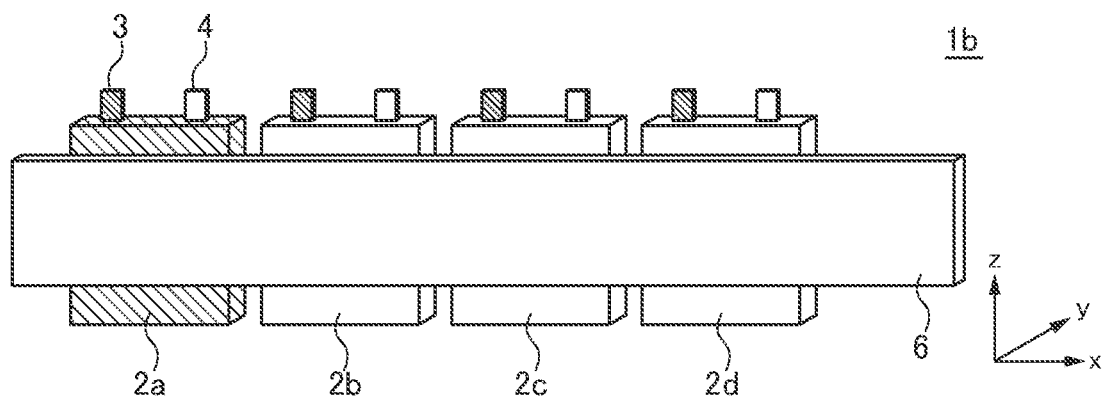

FIGS. 1A and 1B are views illustrating the basic idea of the present invention for solving the above-described problems in the background art. Hereinafter, the basic idea of the present invention will be described with reference to FIGS. 1A and 1B, followed by detailed description of the configuration of a battery pack according to embodiments of the present invention.

FIG. 1A illustrates a battery pack 1a having a structure in which five thin cells 2a to 2e each having the same shape as that of the thin cell 101a illustrated in FIGS. 13A to 13C are stacked in the y-direction. The thin cells 2a to 2e each have a positive terminal 3 and a negative terminal 4 on one of the two z-direction surfaces thereof. In the battery pack 1a, the thin cells 2 adjacent in the y-direction are heat-insulated by a heat insulating member 5. This can suppress heat conduction between the thin cells 2 adjacent in the y-direction, making it possible to prevent propagation of abnormal heat generation in the y-direction.

FIG. 1B illustrates a battery pack 1b having a structure in which four thin cells 2a to 2d are arranged in the x-direction. The battery pack 1b has a heat conducting member 6 contacting in common the y-direction surfaces of the four respective thin cells 2a to 2d. This allows heat generated due to abnormal heat generation to be diffused immediately through the heat conducting member 6. Therefore, even when any one of the thin cells 2 undergoes abnormal heat generation to be high in temperature, it can be cooled immediately, so that it is possible to prevent propagation of the abnormal heat generation due to increased temperature of any one of the thin cells 2.

The battery pack according to the embodiments of the present invention has both the configurations illustrated in FIGS. 1A and 1B and thus exhibits both of the above-described effects. Explanations will now be given of a battery pack according to the embodiments of the invention.

Figure 2:
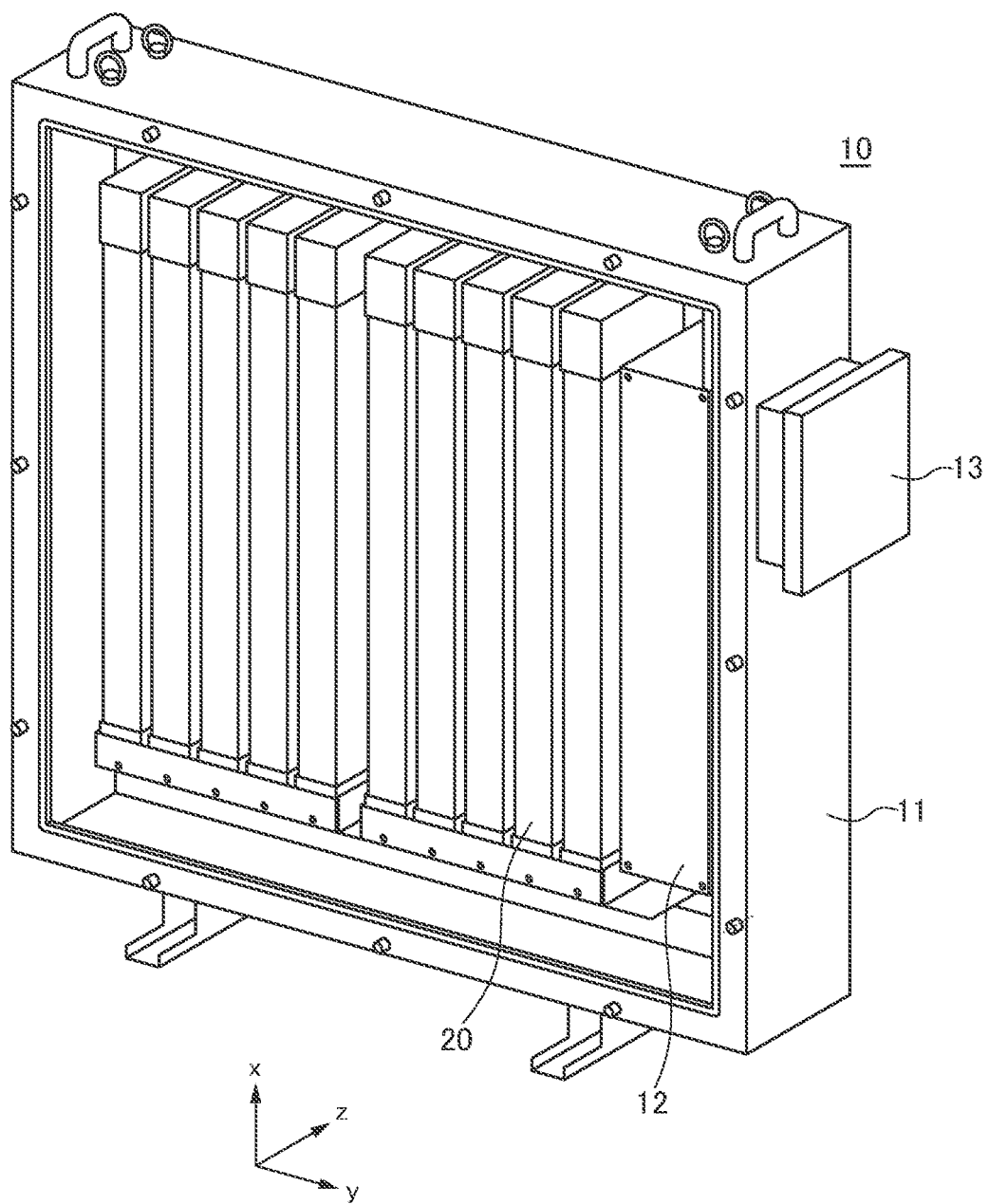
FIG. 2 is a perspective view illustrating the outer appearance of an ESS 10 provided with battery packs 20 according to a first embodiment of the present invention.

FIG. 2 is a perspective view illustrating the outer appearance of an ESS 10 provided with battery packs 20 according to the first embodiment of the present invention. As illustrated, the ESS 10 has a structure in which ten battery packs 20 each having a rectangular parallelepiped shape are arranged in the y-direction inside a casing 11 having a rectangular tubular shape whose cross section is substantially square. Although details will be described later, 28 thin cells 2 illustrated in FIG. 1 are housed in each battery pack 20, and by connecting the 28 thin cells 2 in series or in parallel, one battery pack 20 is constituted. The widths of the casing 11 in the x- and y-directions are about 100 cm, and the width thereof in the z-direction is about 20 cm. The weight of the ESS 10 provided with 10 battery packs 20 is about 100 kg, and a power of 13.5 kW can be supplied from the ESS 10.

Each battery pack 20 is connected to a battery management system 12 for control disposed on one end side in the y-direction of a space in the casing 11 through a not-shown wiring. The battery management system 12 includes a control circuit for controlling each battery pack 20 and performs charge/discharge control for each battery pack 20. A wiring board 13 is disposed on the side surface of the casing 11. The wiring board 13 includes a breaker and various terminals and is connected to the battery management system 12. The battery management system 12 is connected to a device (e.g., various electrical devices installed in a house) to be supplied with power and is connected also to an external computer (not illustrated) through the various terminals in the wiring board 13. The external computer plays a role of executing status monitoring and control of each battery pack 20 through the battery management system 12.

Figure 3:
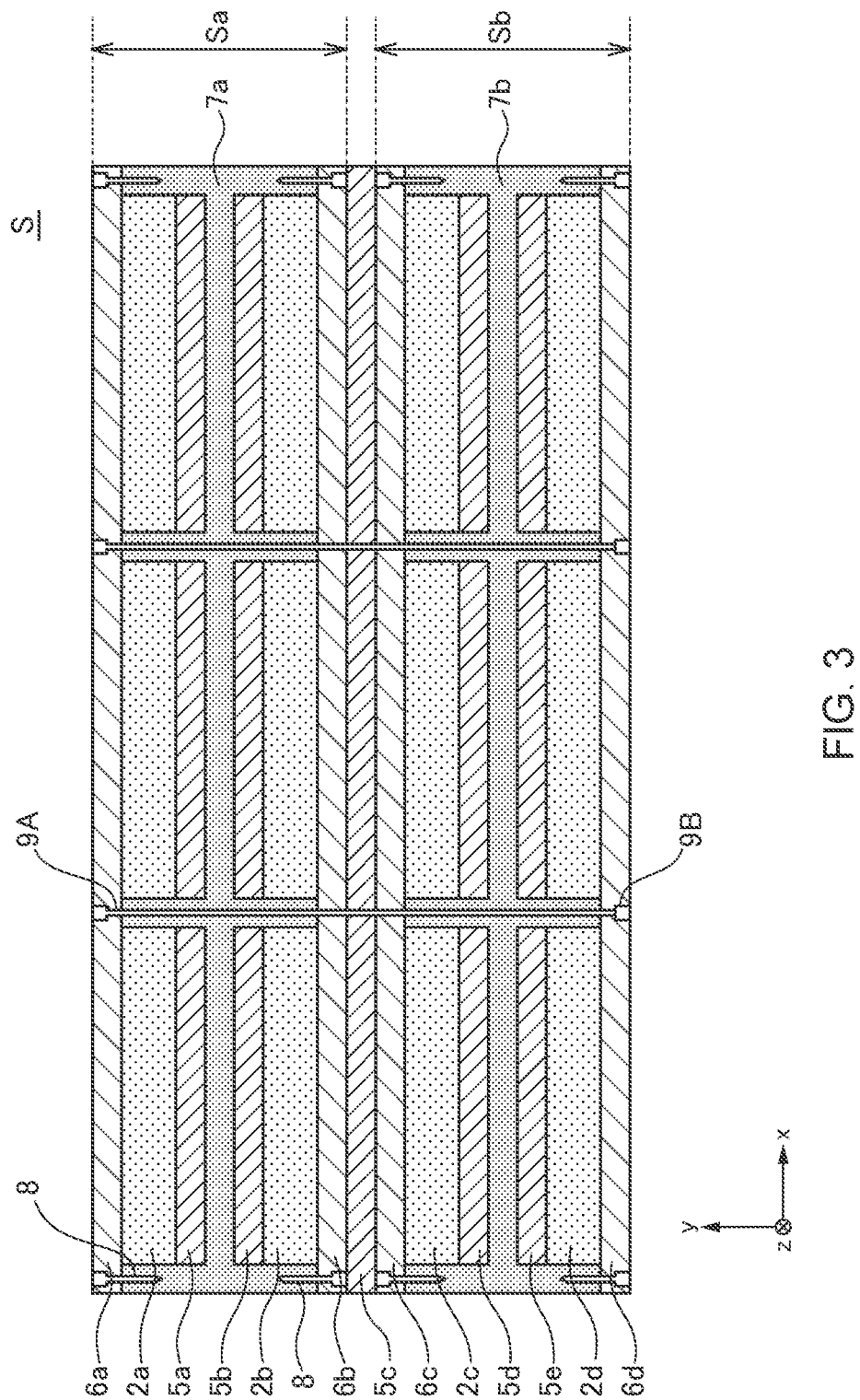
FIG. 3 is a schematic view illustrating a structural body S included in each battery pack 20 according to the first embodiment of the present invention.

FIG. 3 is a schematic view illustrating a structural body S included in each battery pack 20. As illustrated, the structural body S includes 12 thin cells 2; actually, as described above, the structural body S includes 28 thin cells 2. Among these thin cells 2, four thin cells stacked in the y-direction (thickness direction) constitute a unit stacked body. Thus, the structural body S has a structure in which a plurality of the unit stacked bodies are arranged in the x- and z-directions. The structure including 28 thin cells 2 to be actually used will be described later with reference to FIGS. 4A, 4B, 5, 6A to 6C, 7A to 7C, 8A to 8C, 9A to 9C, and 10 and, here, the basic idea of the structural body S according to the present embodiment will be described.

As illustrated in FIG. 3, the structural body S has a configuration in which a plurality of the thin cells 2 are arranged in a matrix form in the x- and y-directions. When focusing on the y-direction in this structure, the structural body S has a configuration in which a heat conducting member 6a (first heat conducting member), a thin cell 2a (first thin cell), a heat insulating member 5a, a resin holder 7a, a heat insulating member 5b (which are collectively referred to as a first heat insulating member), a thin cell 2b (second thin cell), a heat conducting member 6b (second heat conducting member), a heat insulating member 5c (second heat insulating member), a heat conducting member 6c (third heat conducting member), a thin cell 2c (third thin cell), a heat insulating member 5d, a resin holder 7b, a heat insulating member 5e (which are collectively referred to as a third heat insulating member), a thin cell 2d (fourth thin cell), and a heat conducting member 6d (fourth heat conducting member) are stacked in order in the y-direction. When focusing on the x-direction, the heat conducting members 6 each contact in common the y-direction surfaces of the plurality of thin cells 2 arranged in the x-direction.

The heat conducting members 6a and 6b are fixed to the resin holder 7a by a plurality of tapping screws 8 (first fixing member), whereby a structural body Sa (first structural body) including the heat conducting member 6a, thin cell 2a, heat insulating member 5a, resin holder 7a, heat insulating member 5b, thin cell 2b and heat conducting member 6b is formed. Similarly, the heat conducting members 6c and 6d are fixed to the resin holder 7b by a plurality of tapping screws 8 (second fixing member), whereby a structural body Sb (second structural body) including the heat conducting member 6c, thin cell 2c, heat insulating member 5d, resin holder 7b, heat insulating member 5e, thin cell 2d and heat conducting member 6d is formed. The structural body S is constituted by the thus formed structural bodies Sa and Sb and heat insulating member 5c. The structural bodies Sa and Sb are fixed to the heat insulating member 5c using bolts 9A and nuts 9B (third fixing members).

According to the above structure, the heat insulating member is disposed between the thin cells 2 arranged in the y-direction without fail. Therefore, the structure illustrated in FIG. 1A is realized, thus making it possible to prevent the propagation of abnormal heat generation in the y-direction.

Further, the thin cells 2 contact any of the heat conducting members 6 without fail, so that, as in the example of FIG. 1B, even when any one of the thin cells 2 undergoes abnormal heat generation to be high in temperature, the heat generated due to the abnormal heat generation can be diffused immediately through the heat conducting member 6. Thus, it is possible to prevent propagation of the abnormal heat generation due to increased temperature of any one of the thin cells 2.

The following specifically describes the configuration of the structural body S including the 28 thin cells 2.

Figure 4A:
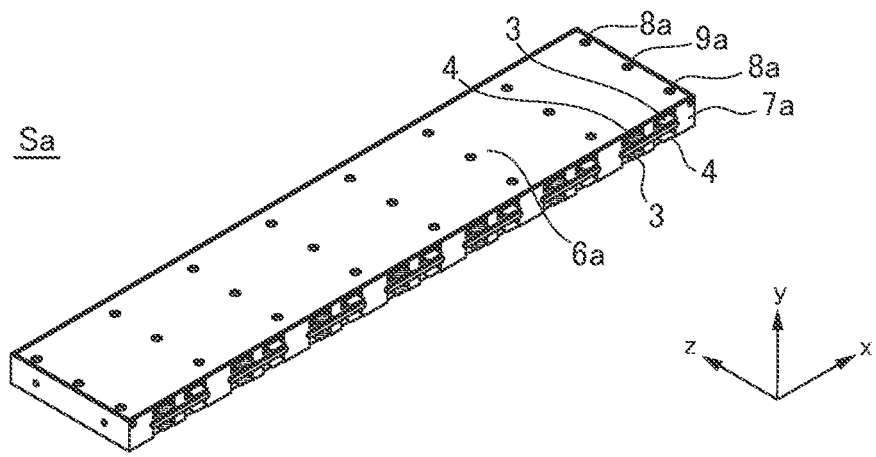
FIG. 4A is a perspective view illustrating the outer appearance of the structural body Sa included in the structural body S according to the first embodiment of the present invention.
Figure 4B:
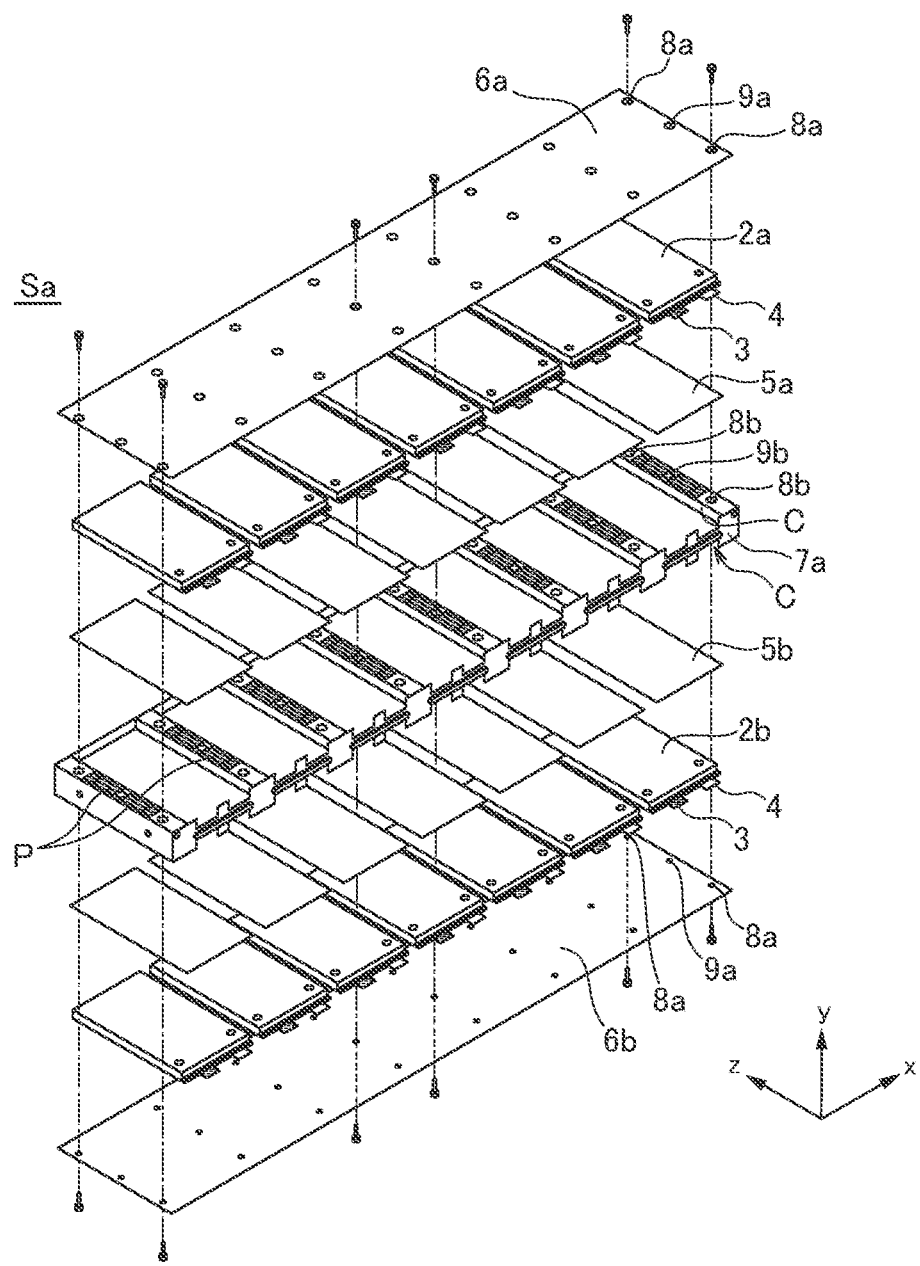
FIG. 4B is an exploded perspective view of the structural body Sa.
Figure 5:
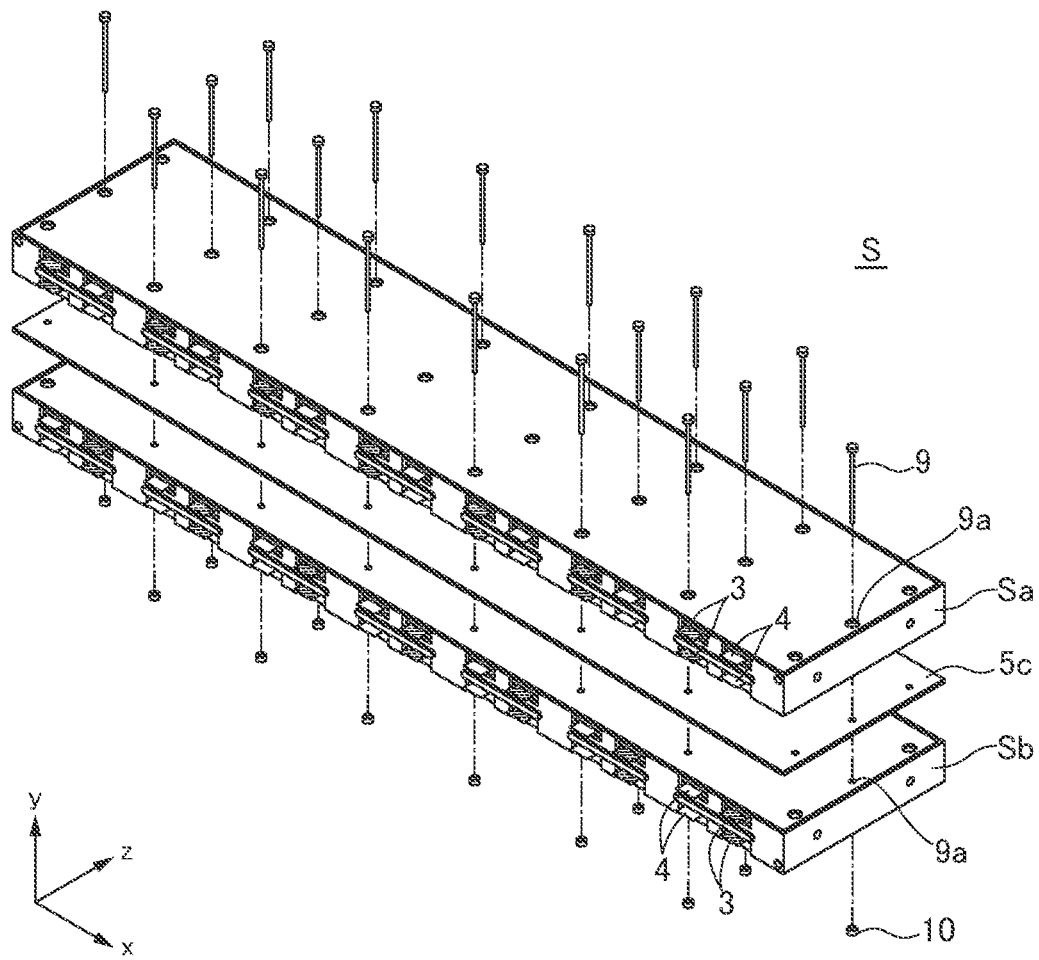
FIG. 5 is a view illustrating the outer appearance of the structural body S according to the first embodiment of the present invention.

FIG. 4A is a perspective view illustrating the outer appearance of the structural body Sa included in the structural body S, and FIG. 4B is an exploded perspective view of the structural body Sa. The structural bodies Sa and Sb have the same configuration, so only the structural body Sa is illustrated in FIGS. 4a and 4b. FIG. 5 is a view illustrating the outer appearance of the structural body S.

The heat conducting members 6a and 6b are each a plate-like member as illustrated in FIG. 4B and each constituted by a material having high heat conductivity. Specifically, the heat conducting members 6a and 6b are each preferably constituted by, e.g., an aluminum plate.

The resin holder 7a is a rectangular parallelepiped member formed by, e.g., a plastic having a heat insulating property. Although it is not essential that the resin holder 7a has a heat insulating property, it preferably has a heat insulating property. As illustrated in FIG. 4B, seven housings C each having a recessed shape in which the thin cell 2 can be housed are formed on each of the two y-direction surfaces of the resin holder 7a.

In each housing C, the heat insulating member 5 and the thin cell 2 are disposed in this order from the bottom surface side of the housing C. The heat insulating member 5 is a heat insulating sheet formed into a shape substantially the same as the xz plane shape of the thin cell 2 and is constituted by, e.g., a foamed plastic. As described later, the depth of each housing C is set to a value slightly smaller than the sum of the heights of the heat insulating member 5 and thin cell 2 so as to apply a predetermined pressure to the thin cell 2 when the heat conducting members 6a and 6b are screw-fixed to the resin holder 7a in the manner as will be described later. The heat insulating member 5, which is a foamed plastic, is deformed by absorbing the pressure, allowing the thin cell 2 to tightly adhere to both the heat conducting member 6 and heat insulating member 5.

The resin holder 7a has a porous space P between the housings C adjacent in the x-direction. The porous space P is formed by partitioning, using partition plates, a cavity provided between holes 8b and 9b (to be described later) formed in areas each between the seven housings C arranged in the x-direction. The porous space P can be formed into various shapes such as the shape of Chinese character "田" or "日" as viewed in the y-direction. The partition plates may be formed integrally with the resin holder 7a by being incorporated into a die for forming the resin holder 7a or may be inserted into the space after formation of the resin holder 7a.

When the heat conductivity of the resin holder 7a is higher than that of air, the cavity is preferably formed in the areas each between the seven housings C arranged in the x-direction in order to suppress heat conduction in the x-direction. However, when only one large cavity is formed, air convection may occur inside the cavity, so that heat conduction between the thin cells 2 adjacent in the x-direction is enhanced rather than suppressed. Thus, by partitioning the cavity to form the porous space P, such air convection is prevented from occurring, so that it is possible to suppress heat conduction between the thin cells 2 adjacent in the x-direction.

The heat conducting members 6a and 6b are screw-fixed to the resin holder 7a using tapping screws 8 as described above, thereby forming the structural body Sa having a structure in which each of the plurality of thin cells 2 is sandwiched between the heat insulating member 5 and the heat conducting member 6. The thus formed structural body Sa and the structural body Sb having the same structure as the structural body Sa are fixed to each other by the bolts 9A and nuts 9B with the heat insulating member 5c sandwiched therebetween as illustrated in FIG. 5, whereby the structural body S having a rectangular parallelepiped shape as a whole is formed.

The following describes in detail the fixation using the tapping screws 8 and bolts 9A. As illustrated in FIG. 4B, the resin holder 7a has three holes in areas each between the seven housings C arranged in the x-direction, including any of holes 8b (for the tapping screw 8) and 9b (for the bolt 9A). Specifically, a total of six holes 8b for the tapping screw 8 (four at the four corners of the structural body Sa and two at the center thereof in the xz plane) is formed, as can be seen from FIG. 4B. All the other holes are the holes 9b for bolt 9A as can be seen from FIG. 5. The hole 9b penetrates the resin holder 7a for passing the bolt 9A therethrough, whereas the hole 8b does not. The heat conducting member 6 has holes 8a and holes 9a so as to correspond, respectively, to the holes 8b and holes 9b.

As schematically illustrated in FIG. 3, the holes 8a, 9a, 8b, 9b, and the tapping screw 8, bolt 9A, nut 9B are configured such that the head of the tapping screw 8, the head of the bolt 9A, and the nut 9B do not protrude from the surface of the heat conducting member 6. Specifically, as for the tapping screw 8, it is preferable to use one whose surface of the head is flat, such as a countersunk type, and to screw such a tapping screw 8 into the holes 8a and 8b so as to make the surface of its head flush with the surface of the heat conducting member 6. As for the bolt 9A and nut 9B, it is preferable to use a bolt having a length equal to the width of the structural body S in the y-direction and to provide a space capable of housing the head of the bolt 9A and nut 9B in the hole 9a. With the above configuration, it is possible to prevent the tapping screw 8, bolt 9A and nut 9B from being an obstruction in stacking the structural body Sb, heat insulating member 5c and structural body Sa as illustrated in FIG. 5 or performing lamination to be described later.

The following describes a manufacturing method for the battery pack 20 with reference to FIGS. 6A to 6C, 7A to 7C, 8A to 8C, 9A to 9C, whereby the more detailed configuration of the structural body S and the entire configuration of the battery pack 20 are made apparent.

Figure 6A:
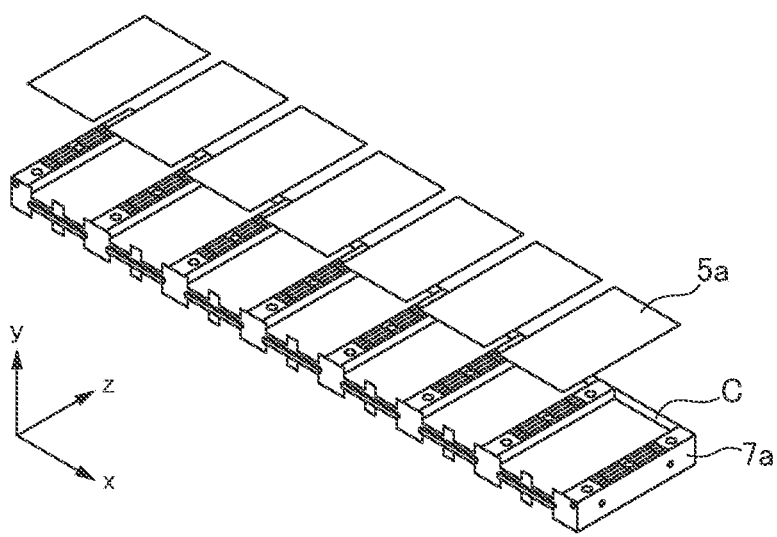
FIGS. 6A to 6C, 7A to 7C, 8A to 8C, and 9A to 9C are views for explaining a manufacturing method of the battery pack 20 according to the first embodiment of the present invention.
Figure 6B:
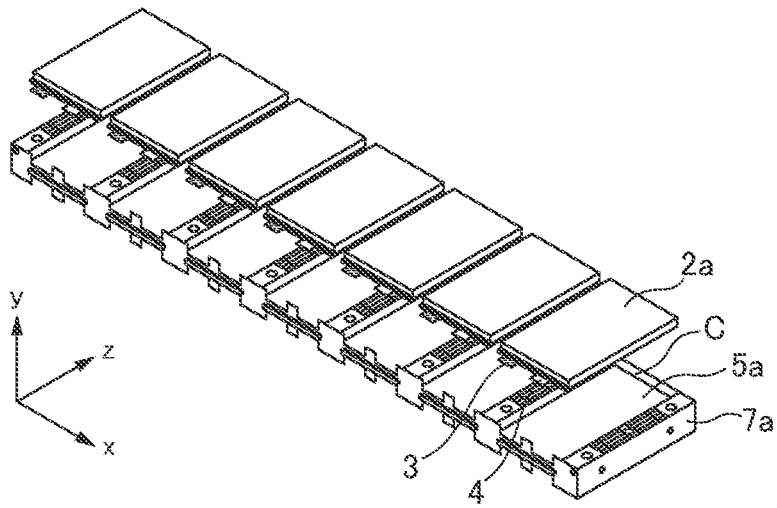
Figure 6C:
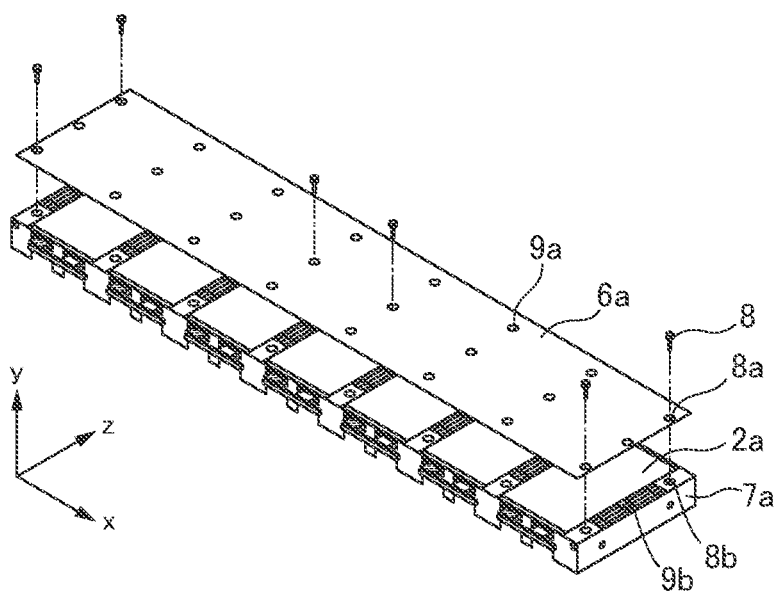

First, as illustrated in FIG. 6A, the heat insulating members 5a are disposed in their corresponding housings C formed on one surface of the resin holder 7a in the y-direction formed using a die. Subsequently, as illustrated in FIG. 6B, the thin cells 2a are disposed on their corresponding heat insulating members 5a. As illustrated, each housing C has cuts for exposing therethrough the terminals 3 and 4 of the thin cell 2a, and the thin cells 2a are disposed in the respective housings C such that the terminals 3 and 4 of all the thin cells 2a are exposed from the cuts in the same direction. Thereafter, as illustrated in FIG. 6C, the plate-like heat conducting member 6a is disposed so as to cover the upper surfaces of the respective thin cells 2a and fixed to the resin holder 7a using six tapping screws 8.

Figure 7A:
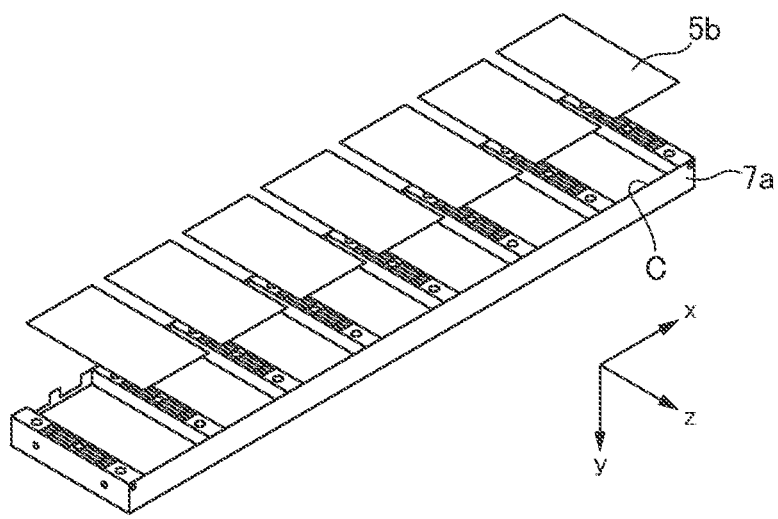
Figure 7B:
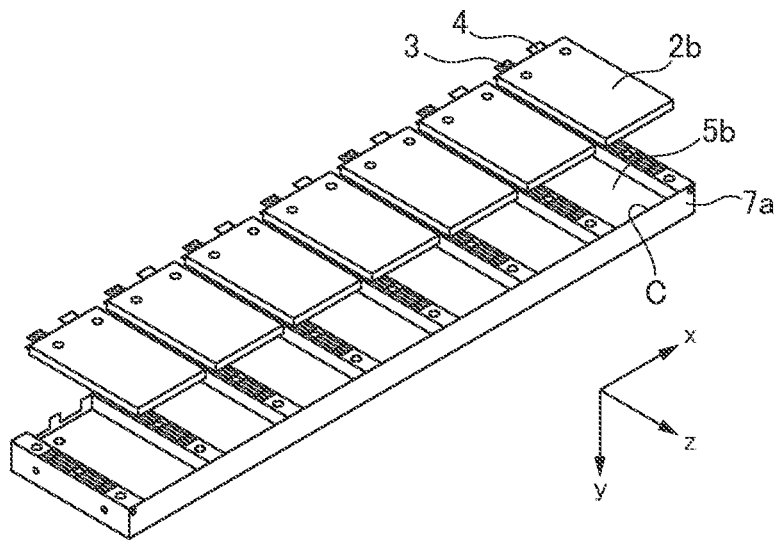
Figure 7C:
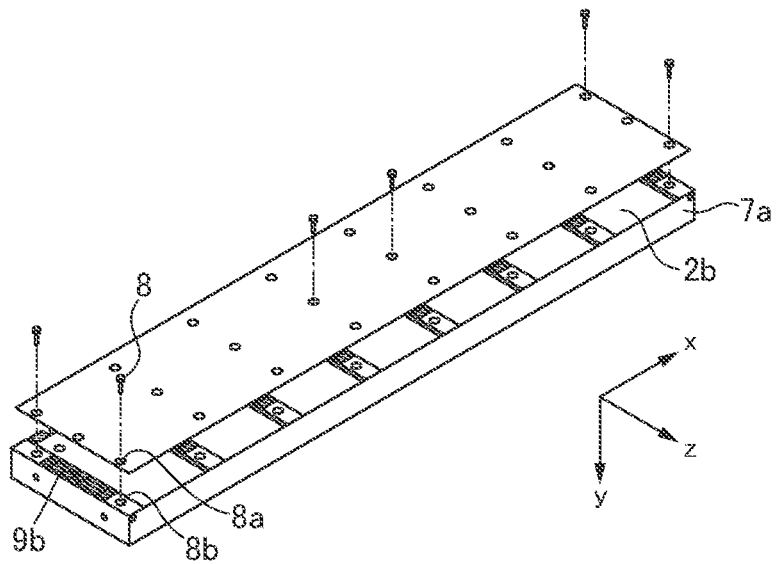

Then, the above-described processes are repeated with the resin holder 7a turned upside down. That is, as illustrated in FIG. 7A, the heat insulating members 5b are disposed in their corresponding housings C formed on the other surface of the resin holder 7a in the y-direction. Subsequently, as illustrated in FIG. 7B, the thin cells 2b are disposed on their corresponding heat insulating members 5b. At this time, each thin cell 2b is disposed such that the positive terminal 3 thereof and the positive terminal 3 of the thin cell 2a overlap each other in the y-direction. Thereafter, as illustrated in FIG. 7C, the plate-like heat conducting member 6b is disposed so as to cover the upper surfaces of the respective thin cells 2 and fixed to the resin holder 7a using six tapping screws 8.

By the processes thus far, the structural body Sa illustrated in FIG. 4A is completed. After the structural body Sb is formed in the same manner, the structural body Sb, heat insulating member 5c and structural body Sa are stacked in this order as illustrated in FIG. 5, and 18 sets of the bolts 9A and nuts 9B are used to fix them. At this time, the structural bodies Sa and Sb are adjusted indirection such that the positive terminal 3 of each thin cell 2 in the structural body Sa and the negative terminal 4 of each thin cell 2 in the structural body Sb overlap each other in the y-direction. Thus, the structural body S illustrated in FIG. 5 is completed.

Figure 8A:
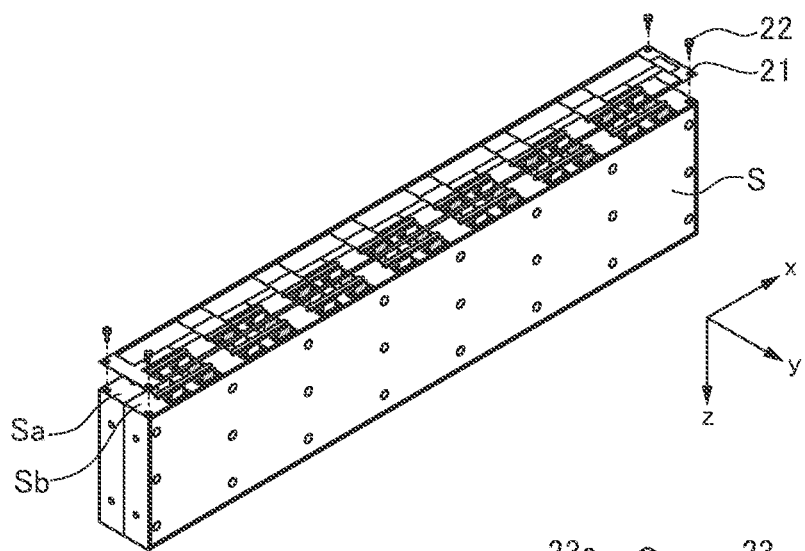
Figure 8B:
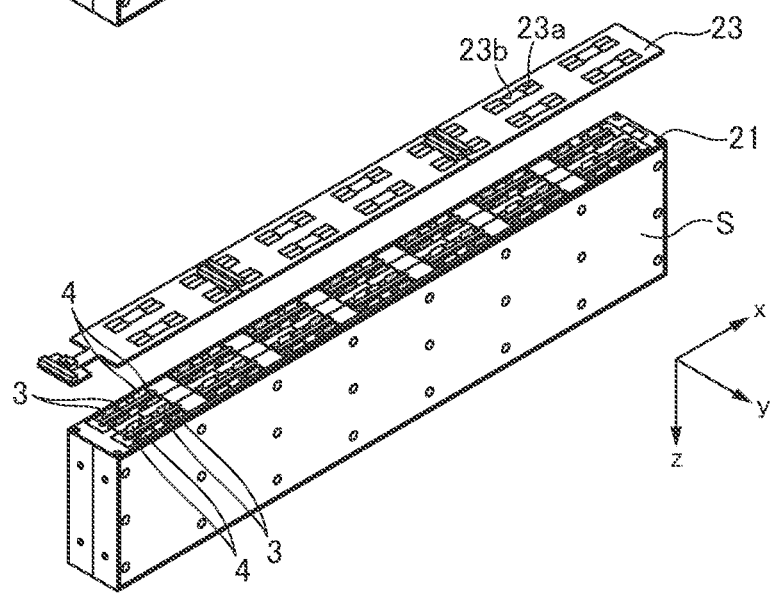

After completion of the structural body S, a PCB (Printed Circuit Board) holder 21 is fixed to the terminal surface (surface of each thin cell 2 from which the terminals 3 and 4 are exposed) of the structural body S using tapping screws 22 as illustrated in FIG. 8A, and then the printed board 23 is attached to the PCB holder 21 as illustrated in FIG. 8B. The printed board 23 has formed therein holes 23a for exposing the terminals 3 and 4 of the thin cell 2 and holes 23b for discharging a gas or smoke generated due to abnormal heat generation. As illustrated in FIG. 8B, the holes 23b are each disposed between the electrode holes 23a for exposing, respectively, the positive and negative terminals 3 and 4 of each thin cell 2.

Figure 8C:
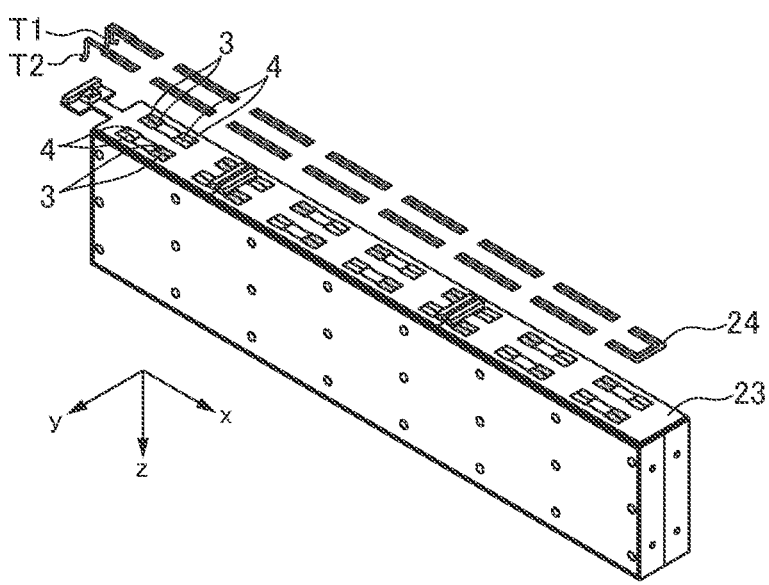

Then, as illustrated in FIG. 8C, a bus bar 24 is soldered onto the printed board 23. The bus bar 24 electrically connects each thin cell 2 to terminals T1 and T2 of the battery pack 20.

Figure 10:
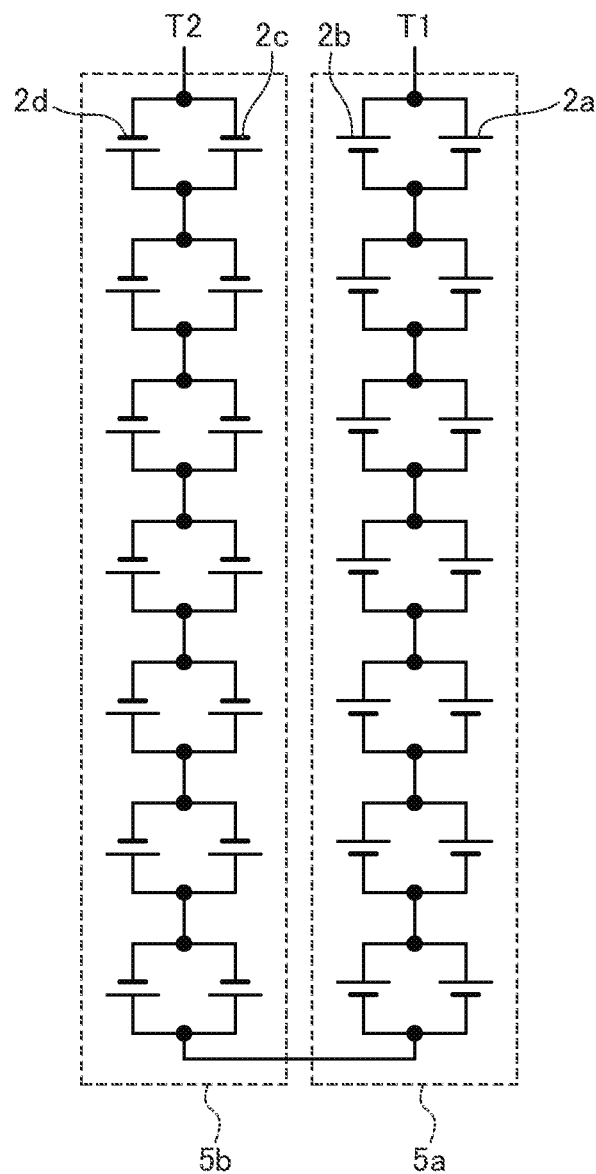
FIG. 10 is a view illustrating the electrical connection between the thin cells 2 in the battery pack 20.

The following describes electrical connection between the thin cells 2 in the battery pack 20. FIG. 10 is a view illustrating the electrical connection between the thin cells in the battery pack 20. As illustrated, in each of the structural bodies Sa and Sb, two thin cells 2 adjacent in the y-direction are connected in parallel, and batteries each constituted by the parallel-connected two thin cells 2 are connected in series. Then, a battery constituted by the structural body Sa and a battery constituted by the structural body Sb are connected in series between the terminals T1 and T2 of the battery pack 20.

The bus bar 24 realizing the above electrical connection has a simple configuration that connects the terminals 3 and 4 linearly as illustrated in FIG. 8C. This can be enabled by, as described above, configuring the structural bodies Sa and Sb such that the terminals 3 and 4 of all the thin cells 2 are exposed in the same direction and stacking the structural bodies Sa and Sb such that the positive terminal 3 of each thin cell 2 in the structural body Sa and the negative terminal 4 of each thin cell 2 in the structural body Sb overlap each other in the y-direction.

Figure 9A:
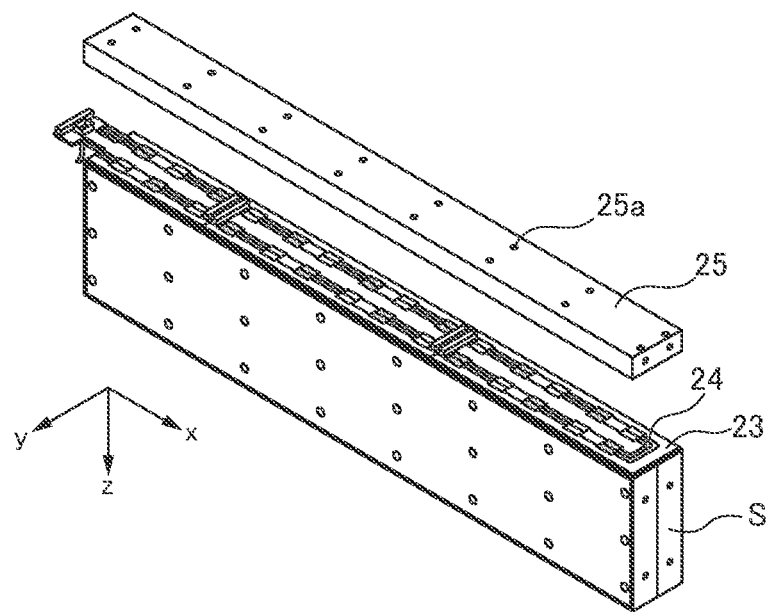

Then, as illustrated in FIG. 9A, a top cover 25 is disposed so as to cover the entire printed board 23 including the bus bar 24. At this time point, the top cover 25 need not be screw-fixed to the printed board 23. The top cover 25 has formed therein holes 25a for discharging a gas or smoke generated due to abnormal heat generation at positions corresponding to the holes 23b of the printed board 23 illustrated in FIG. 8B.

Figure 9B:
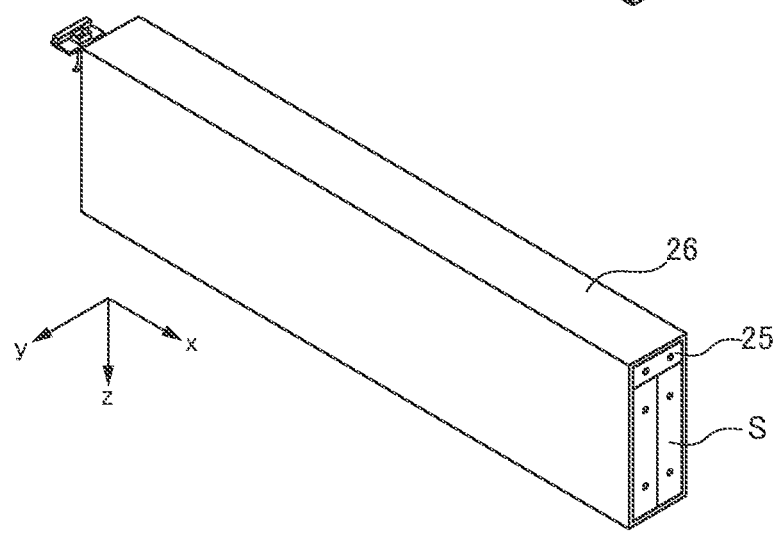

Then, as illustrated in FIG. 9B, the top cover 25 and structural body S are inserted into a tubular cover 26, followed by application of heat treatment. As a result, the cover 26 is contracted to fix the top cover 25 to the structural body S, and the side surfaces of the top cover 25 and structural body S are covered with the cover 26. The material of the cover 26 is preferably, e.g., polyethylene terephthalate.

Figure 9C:
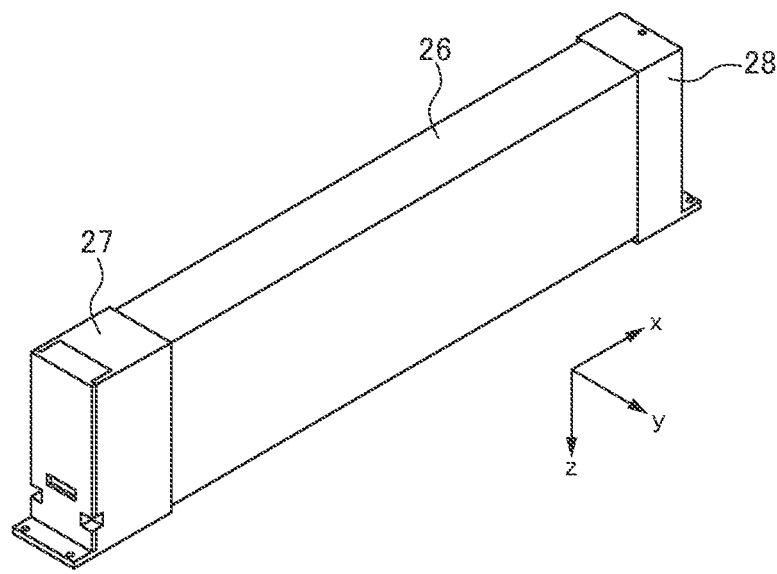

Finally, as illustrated in FIG. 9C, a terminal cover 27 is attached to the one ends of the top cover 25 and structural body S which are covered with the cover 26, and a back cover 28 is attached to the other ends thereof. The terminal cover 27 has external terminals (not illustrated) of the battery pack 20 to be connected to the terminals T1 and T2 illustrated in FIG. 8C. The terminals T1 and T2 are connected to the battery management system 12 illustrated in FIG. 2 through the external terminals. By the processes thus far, the battery pack 20 illustrated in FIG. 2 is completed. A predetermined water-proof structure is preferably provided between the covers 27, 28 and the cover 26.

As described above, according to the battery pack 20 of the present embodiment, it is possible to immediately dissipate heat generated due to abnormal heat generation by means of the heat conducting member 6 while suppressing heat conduction between the thin cells 2 adjacent in the y-direction by means of the heat insulating member (heat insulating member 5 and resin holder 7). This makes it possible to prevent propagation of the abnormal heat generation occurring in any one of the thin cells 2.

Further, according to the battery pack 20 of the present embodiment, a gas or smoke generated due to abnormal heat generation can be immediately discharged through the holes 23b formed in the printed board 23 and holes 25a formed in the top cover 25, thereby making it possible to prevent propagation of abnormal heat generation due to gas or smoke staying inside the battery pack 20. The tubular cover 26 is immediately broken when gas or smoke is ejected through the holes 23b and 25a. Thus, the cover 26 by no means hinders discharge of gas or smoke.

The following describes the ESS 10 according to a second embodiment of the present invention. The ESS 10 according to the present embodiment differs from the ESS 10 according to the first embodiment in the structure of the structural body S disposed in the battery pack 20. Other configurations are the same as those of the ESS 10 according to the first embodiment, so the same reference numerals are given to the same elements, and description will be made focusing on points different from the first embodiment.

Figure 11:
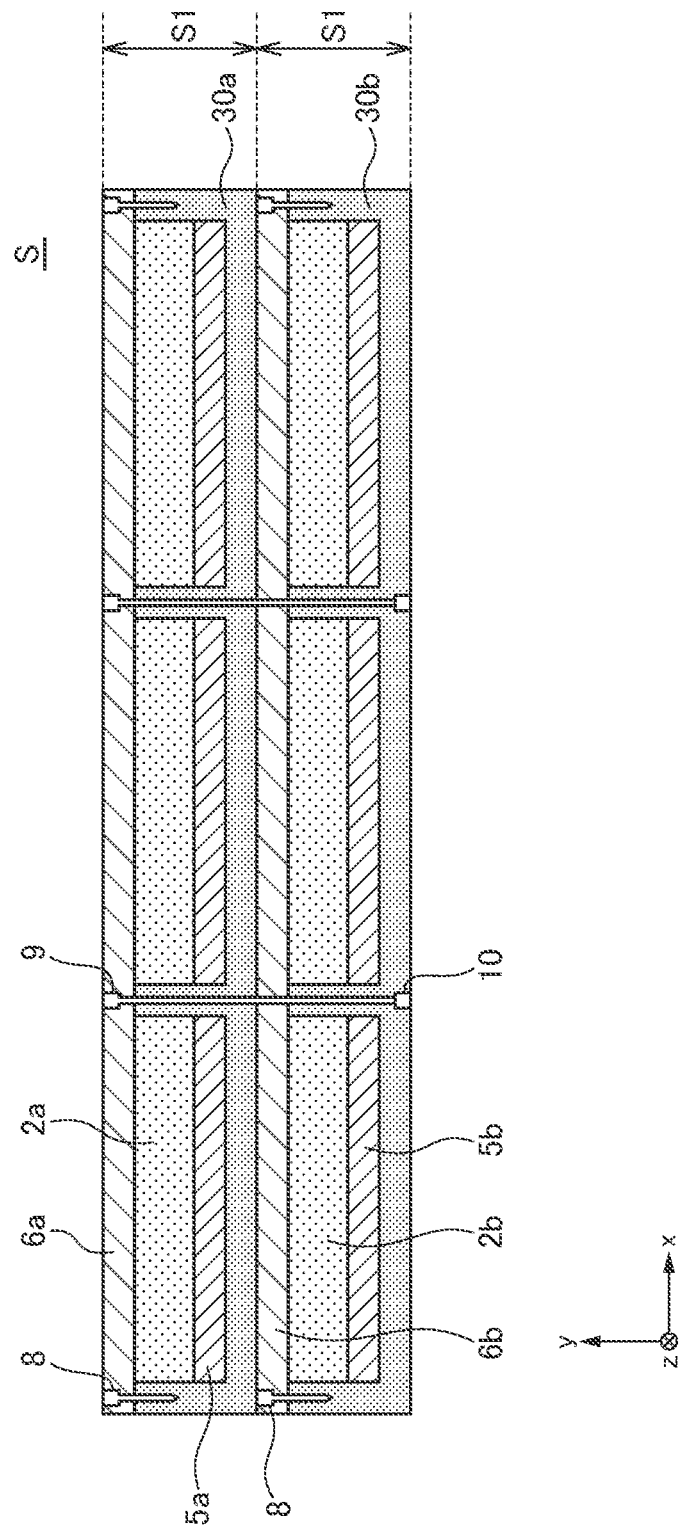
FIG. 11 is a schematic view illustrating a structural body S included in each battery pack 20 according to a second embodiment of the present invention.

FIG. 11 is a schematic view illustrating the structural body S included in each battery pack 20 according to the present embodiment. As illustrated, the structural body S includes 6 thin cells 2; actually, the structural body S according to the present embodiment also includes 28 thin cells 2. The structure including 28 thin cells 2 to be actually used will be described later with reference to FIG. 12 and, here, the basic idea of the structural body S according to the present embodiment will be described.

As illustrated in FIG. 11, the structural body S has a configuration in which a plurality of the thin cells 2 are arranged in a matrix form in the x- and y-directions, as in the battery pack 20 according to the first embodiment. When focusing particularly on the y-direction in this structure, the structural body S according to the present embodiment has a configuration in which a heat conducting member 6a (first heat conducting member), a thin cell 2a (first thin cell), a heat insulating member 5a, a resin holder 7a (which are collectively referred to as a first heat insulating member), a heat conducting member 6b (second heat conducting member), a thin cell 2b (second thin cell), a heat insulating member 5b, a resin holder 7b (which are collectively referred to as a second heat insulating member) are stacked in order in the y-direction. When focusing on the x-direction, the heat conducting members 6 each contact in common the y-direction surfaces of the plurality of thin cells 2 arranged in the x-direction.

The heat conducting member 6a is fixed to the resin holder 7a by a plurality of tapping screws 8 (first fixing member). Similarly, the heat conducting member 6b is fixed to the resin holder 7b by a plurality of tapping screws 8 (second fixing member). A combination of the heat conducting member 6a, thin cell 2a, heat insulating member 5a, and resin holder 7a constituting a first structural body and a combination of the heat conducting member 6b, thin cell 2b, heat insulating member 5b and resin holder 7b constituting a second structural body each constitute a unit structural body S1 of the battery pack 20 according to the present embodiment. The structural body S according to the present embodiment is obtained by stacking in the y-direction the above unit structural bodies S1 with the same orientation. The unit structural bodies S1 are fixed to each other by means of bolts 9A and nuts 9B (third fixing member).

According to the above structure as well, the heat insulating member is disposed between the thin cells 2 arranged in the y-direction without fail. Therefore, the structure illustrated in FIG. 1A is realized, thus making it possible to prevent propagation of abnormal heat generation in the y-direction.

Further, the thin cells 2 contact any of the heat conducting members 6 without fail, so that, as in the example of FIG. 1B, even when any one of the thin cells 2 undergoes abnormal heat generation to be high in temperature, the heat generated due to the abnormal heat generation can be diffused immediately through the heat conducting member 6. Thus, it is possible to prevent propagation of the abnormal heat generation due to increased temperature of any one of the thin cells 2.

Figure 12:
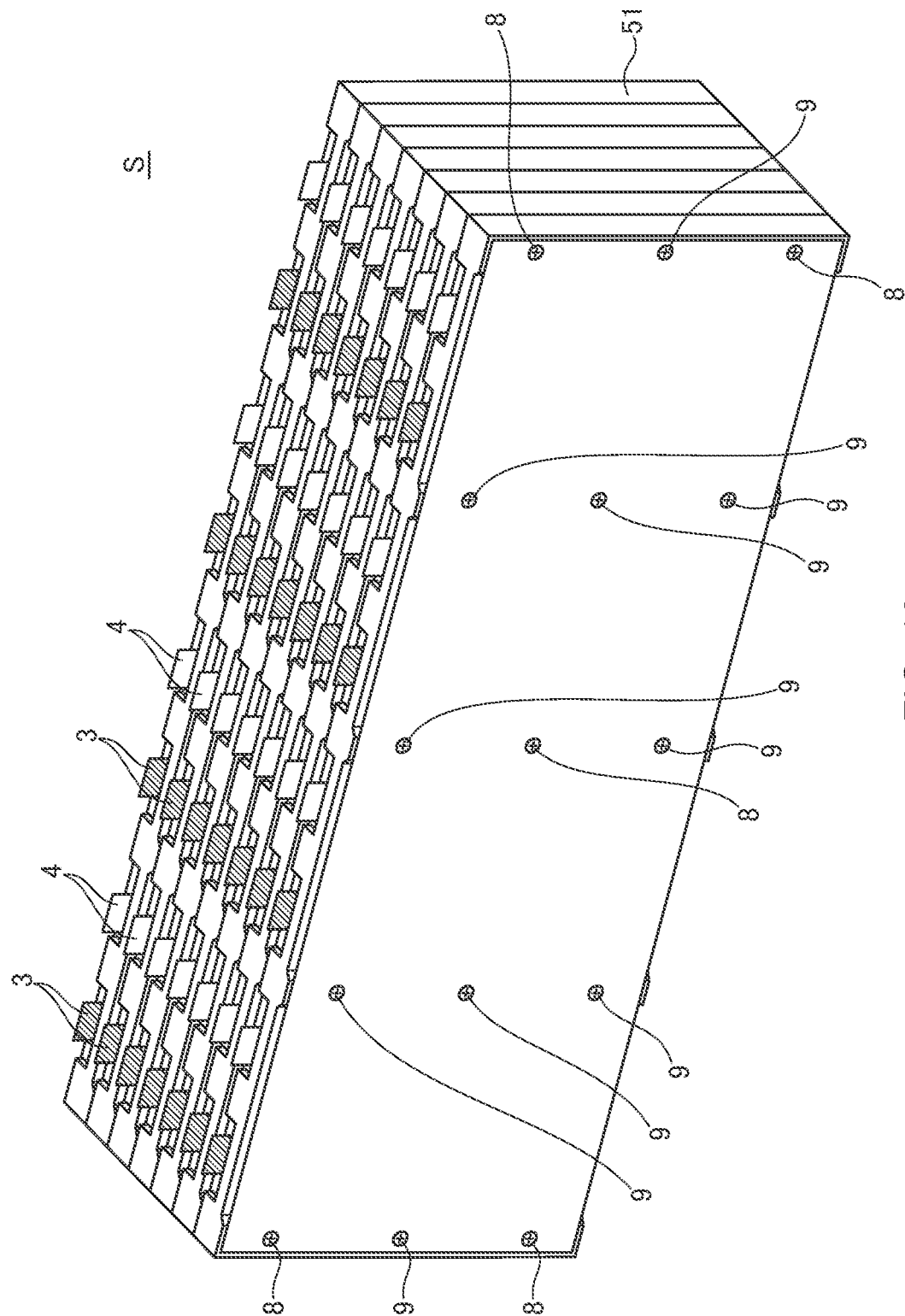
FIG. 12 is a perspective view illustrating the outer appearance of the structural body S according to the second embodiment of the present invention.

FIG. 12 is a perspective view illustrating the outer appearance of the structural body S according to the present embodiment. The structural body S has a structure obtained by sacking seven unit structural bodies S1 illustrated in FIG. 11. Each unit includes four thin cells 2 and, thus, the entire structural body S includes 28 thin cells 2. Although not illustrated, the structural body S according to the present embodiment is also attached with the PCB holder, printed board, bus bar, top cover, tubular cover, terminal cover and back cover having the same configurations as those of the first embodiment illustrated in FIGS. 9A to 9C and 10, and these members and structural body S constitute the battery pack 20 according to the present embodiment. It is also similar to the battery pack 20 according to the first embodiment in that the printed board and top cover each have holes for discharging a gas or smoke generated due to abnormal heat generation.

As described above, according to the battery pack 20 of the present embodiment, it is possible to immediately dissipate heat generated due to abnormal heat generation by means of the heat conducting member 6 while suppressing heat conduction between the thin cells 2 adjacent in the y-direction by means of the heat insulating member (heat insulating member 5 and resin holder 7). This makes it possible to prevent propagation of the abnormal heat generation occurring in any one of thin cells 2.

It is apparent that the present invention is not limited to the above embodiments, but may be modified and changed without departing from the scope and spirit of the invention.

What is claimed is:

1. A battery pack comprising:
 a plurality of thin cells arranged in a matrix form in a first direction and a second direction perpendicular to the first direction, wherein a width of each thin cell in the first direction is smaller than widths of each thin cell in the second direction and a third direction perpendicular to the first and second directions, and wherein each of the thin cells has a surface substantially perpendicular to the first direction;
 a heat insulating member that insulates heat between the thin cells adjacent in the first direction; and
 a heat conducting member that contacts in common the surfaces of the thin cells arranged in the second direction
 wherein each of the thin cells is sandwiched between the heat insulating member and the heat conducting member,
 wherein the heat insulating member includes a plurality of heat insulating sheets,
 wherein each of the heat insulating sheets and an associated one of the thin cells are sandwiched between a resin holder having a housing capable of housing the thin cell and the heat conducting member, and
 wherein the resin holder and the heat conducting member are fixed to each other.

2. The battery pack as claimed in claim 1, wherein the resin holder has a porous space between the thin cells adjacent in the second direction.

3. A battery pack comprising a plurality of unit stacked bodies each including first to fourth thin cells stacked in a thickness direction, the unit stacked bodies being arranged in a planar direction substantially perpendicular to the thickness direction,
- wherein each of the unit stacked body further includes first to fourth heat conducting members and first to third heat insulating members,
- wherein the first thin cell is sandwiched between the first heat conducting member and the first heat insulating member,
- wherein the second thin cell is sandwiched between the first heat insulating member and the second heat conducting member,
- wherein the third thin cell is sandwiched between the third heat conducting member and the third heat insulating member,
- wherein the fourth thin cell is sandwiched between the third heat insulating member and the fourth heat conducting member,
- wherein the second heat insulating member is sandwiched between the second and third heat conducting members, and
- wherein each of the first to fourth heat conducting members comprises a common plate-like member for the plurality of unit stacked bodies.

4. The battery pack as claimed in claim 3, further comprising:
- a first resin holder positioned between the first and second thin cells and having a first housing that houses the first thin cell and a second housing that houses the second thin cell;
- a second resin holder positioned between the third and fourth thin cells and having a third housing that houses the third thin cell and a fourth housing that houses the fourth thin cell;
- a first fixing member that fixes the first and second heat conducting members to the first resin holder to form a first structural body including the first heat conducting member, first thin cell, first heat insulating member, second thin cell and second heat conducting member;
- a second fixing member that fixes the third and fourth heat conducting members to the second resin holder to form a second structural body including the third heat conducting member, third thin cell, third heat insulating member, fourth thin cell and fourth heat conducting member; and
- a third fixing member that fixes the first and second structural bodies to the second heat insulating member.

5. The battery pack as claimed in claim 4, wherein the first and second fixing members are configured such that end portions of the first and second fixing members do not protrude from surfaces of the respective first to fourth heat conducting members.

6. The battery pack as claimed in claim 4,
- wherein each of the unit stacked bodies further includes fourth and fifth heat insulating members,
- wherein the first housing therein the first heat insulating member,
- wherein the second housing therein the fourth heat insulating member,
- wherein the third housing therein the third heat insulating member, and
- wherein the fourth housing therein the fifth heat insulating member.

7. A battery pack comprising a plurality of unit stacked bodies,
- wherein each of the unit stacked bodies includes first and second thin cells stacked in a thickness direction, a heat insulating member sandwiched between the first and second thin cells, a first heat conducting member sandwiched between the first thin cell and the heat insulating member, and a second heat conducting member sandwiched between the second thin cell and the heat insulating member,
- wherein each of the first and second heat conducting members comprises a common plate-like member for the plurality of unit stacked bodies,
- wherein the battery pack further comprises:
  - a first resin holder that houses therein the first thin cell; and
  - a second resin holder that houses therein the second thin cell, and
- wherein the first and second heat conducting members and the heat insulating member are disposed between the first and second resin holders.

* * * * *